(12) United States Patent
Kikuyama et al.

(10) Patent No.: US 8,501,138 B2
(45) Date of Patent: Aug. 6, 2013

(54) PRODUCTION METHOD OF HIGH PURITY SILVER TETRAFLUOROBORATE

(75) Inventors: Hirohisa Kikuyama, Osaka (JP); Masayuki Miyashita, Osaka (JP); Masahide Waki, Osaka (JP); Tomohiko Satonaga, Osaka (JP); Kazuhiko Shogami, Osaka (JP)

(73) Assignee: Stella Chemifa Coporation, Osaka (JP)

( * ) Notice: Subject to any disclaimer, the term of this patent is extended or adjusted under 35 U.S.C. 154(b) by 463 days.

(21) Appl. No.: 11/887,324

(22) PCT Filed: Jun. 9, 2006

(86) PCT No.: PCT/JP2006/311658
§ 371 (c)(1),
(2), (4) Date: Oct. 30, 2007

(87) PCT Pub. No.: WO2006/132375
PCT Pub. Date: Dec. 14, 2006

(65) Prior Publication Data
US 2009/0274604 A1    Nov. 5, 2009

(30) Foreign Application Priority Data

Jun. 9, 2005  (JP) ................................. 2005-169366

(51) Int. Cl.
*C01B 35/00* (2006.01)
*C01B 15/12* (2006.01)
*C01B 35/06* (2006.01)

(52) U.S. Cl.
USPC ........................... 423/292; 423/276; 423/279

(58) Field of Classification Search
None
See application file for complete search history.

(56) References Cited

U.S. PATENT DOCUMENTS 2,713,552 A * 7/1955 Lien et al. ..................... 208/311

FOREIGN PATENT DOCUMENTS

JP        10-95609 A     4/1998

OTHER PUBLICATIONS

Meerwein et al.; Simple Laboratory Preparation of anhydrous Silver Tetrafluoroborate; Journal of Inorganic and Nuclear Chemistry, vol. 14, Issues 3-4, pp. 295-296; 1960.*
Kilpatrick et al.; The Conductance and Vapor Pressure of Boron Trifluoride in anhydrous Hydrofluoric Acid; J. Am. Chem. Soc., 76 (22), pp. 5865-5868 1954.*
Clifford et al., "The Hydrogen Fluoride Solvent System—III," J. Inorg. Nucl. Chem., vol. 5, pp. 76-78 (1957).
Clifford et al., "The Hydrogen Fluoride Solvent System—VI," J. Inorg. Nucl. Chem., vol. 20, pp. 147-154 (1961).
Kirk-Othmer Encyclopedia of Chemical Technology, Third Edition, vol. 10, Ferroelectrics to Fluorine Compounds, Organic, John Wiley & Sons, Inc., 1980, p. 795-797.

* cited by examiner

*Primary Examiner* — Guinever Gregorio
(74) *Attorney, Agent, or Firm* — Young & Thompson

(57) ABSTRACT

A production method of high purity silver tetrafluoroborate, capable of producing silver tetrafluoroborate ($AgBF_4$) at purity higher than the conventional, without using an organic solvent. The production method of the present invention is characterized in that the method comprises the step of: reacting silver fluoride with boron trifluoride in the presence of anhydrous hydrofluoric acid. Boron trifluoride is delivered into a solution obtained by dissolving or suspending silver fluoride in an anhydrous hydrofluoric acid solution.

20 Claims, No Drawings

PRODUCTION METHOD OF HIGH PURITY SILVER TETRAFLUOROBORATE

TECHNICAL FIELD

The present invention relates to a production method of a high purity silver tetrafluoroborate ($AgBF_4$).

BACKGROUND ART

Non-patent reference 1: Synth. React. Inorg. Met.-Org. Chem. 18(4), 401-404 (1988)

Non-patent reference 2: Journal of Inorganic and Nuclear Chemistry, Volume 14, Issues 3-4, 1960, Pages 295-296

Patent-related reference 1: JP-A-10-95609 (95609/1998)

As catalysts in organic synthetic reactions, silver compounds of various acids have been used as oxidizing agents or salt exchange materials. Among them, silver tetrafluoroborate is utilized in various organic and catalytic synthetic reactions, and is also a useful substance as a functional dye or ion conduction material. Further, silver tetrafluoroborate has also been noticed as a substance acting as an electrolytic additive of a lithium ion battery for improving cycle characteristics of the battery. For silver tetrafluoroborate, various production methods have been reported.

For example, the non-patent reference 1 describes a reaction of ammonium tetrafluoroborate ($NH_4BF_4$) with silver nitrate ($AgNO_3$) within an organic solvent (acetonitrile). However, in this method, $NH_4NO_3$ as a by-product is included in silver tetrafluoroborate ($AgBF_4$) as a target product, thereby making it difficult to obtain a high purity product and thus requiring to deal with the by-product. Also accompanying thereto is a risk of fire disaster and the like due to usage of the organic solvent.

Similarly, the non-patent reference 2 describes several kinds of production methods. For example, it describes that silver tetrafluoroborate ($AgBF_4$) is easily produced by a reaction among nitric acid, hydrogen fluoride, and boron trifluoride. However, this technique is also problematic in removal of nitric acid as a by-product.

The non-patent reference 2 further describes a reaction of silver fluoride with boron trifluoride in a nitromethane solvent. However, this technique anyway conducts the reaction in an undesirable organic solvent, and is thus accompanied by a risk of fire disaster, explosion, and the like.

In turn, described in the patent-related reference 1 is a technique for conducting a reaction in the presence of anhydrous hydrogen fluoride such that lithium fluoride and boron trifluoride are reacted with each other in the presence of anhydrous hydrogen fluoride. By this reaction, there is produced a novel compound represented by a formula of $LiBF_4 \cdot HF$. In this technique, anhydrous hydrogen fluoride never acts as a solvent. Namely, as apparent from the formula, anhydrous hydrogen fluoride contributes to the reaction, and constitutes a part of a reaction product. It never exists as a simple solvent.

DISCLOSURE OF THE INVENTION

Problem to be solved by the Invention

The present invention has been carried out to solve the above problems.

It is therefore an object of the present invention to provide a production method of high purity silver tetrafluoroborate, capable of producing silver tetrafluoroborate ($AgBF_4$) at purity higher than the conventional, without using an organic solvent.

Means for solving the Problem

The present inventors have earnestly conducted investigation so as to solve the above-described problems, and have narrowly found that the object can be achieved by a production method of silver tetrafluoroborate, characterized in that the method comprises the step of: reacting silver fluoride with boron trifluoride in the presence of anhydrous hydrofluoric acid.

EFFECT OF THE INVENTION

According to the present invention, it is possible to produce silver tetrafluoroborate ($AgBF_4$) at purity higher than the conventional, without using an organic solvent.

BEST MODE FOR CARRYING OUT THE INVENTION

The present invention is configured to react silver fluoride with boron trifluoride in the presence of anhydrous hydrofluoric acid. This enables production of high purity silver tetrafluoroborate without using an organic solvent.

The present invention adopts anhydrous hydrogen fluoride (HF) as a solvent, which does not react with fluorine. Although examples of compounds, which are unreactive with fluorine, include CF, CClF, and the like in addition to hydrofluoric acid, HF is optimum for achieving the intended effect of the present invention.

Anhydrous hydrogen fluoride is preferably 99.9% or higher in concentration. Concentrations of anhydrous hydrogen fluoride of 99.9% or higher enable production of high purity silver tetrafluoroborate.

According to the present invention, it is desirable to introduce a gas containing a boron trifluoride gas, into a solution obtained by dissolving or suspending silver fluoride in an anhydrous hydrofluoric acid solution.

Desirable as silver fluoride is AgF. The solubility of AgF in an anhydrous hydrofluoric acid solution is 83.2. In turn, the solubility of $AgF_3$ in an anhydrous hydrofluoric acid solution is 0.018. AgF is preferable, because silver fluoride is to be preferably dissolved in the solution for a reaction with boron trifluoride. Note that the solubility means a dissolved amount in 100 g of an anhydrous hydrofluoric acid solution.

Note that silver fluoride may be reacted in a suspended state. To facilitate dissolution or suspension, it is desirable to add silver fluoride in a powder state into an anhydrous hydrofluoric acid solution.

Desirable as an introduction gas is one containing a boron trifluoride gas. There is used a boron trifluoride gas itself, or a gas provided by diluting a boron trifluoride gas with an inert gas.

Particularly, it is desirable that a concentration of the boron trifluoride gas in the introduction gas is 50 vol % or more. Concentrations below 50 vol % lead to decreased reaction efficiencies, and also bring about severe splashing of the anhydrous hydrofluoric acid solution to cause decrease of the amount of the anhydrous hydrofluoric acid solution. Note that it is more desirable to adopt a concentration of 100 vol %, i.e., the boron trifluoride gas itself.

Note that the introduction rate of the gas is preferably 1 to 20 L/min.

The temperature of the reaction system of boron trifluoride and silver fluoride is desirably 20° C. or lower. Reactions within such a temperature range prevent volatilization of anhydrous hydrofluoric acid as the solvent, thereby smoothly progressing the reaction.

After the reaction, there is conducted solid-liquid separation, in a manner that silver tetrafluoroborate deposited or crystallized in the anhydrous hydrofluoric acid solution is separated therefrom. After the solid-liquid separation, the separated crystals of tetrafluoroborate are dried. Upon drying, it is desirable to conduct a deoxidization treatment. The deoxidization treatment is conducted so as to remove residual anhydrous hydrofluoric acid and mitigate a load upon a drying process. This deoxidization treatment is to be preferably conducted in a gas atmosphere containing a boron trifluoride gas. Conduction in such an atmosphere causes silver fluoride, which has been left, unreacted, to become silver tetrafluoroborate, thereby enabling obtainment of higher purity silver tetrafluoroborate. Note that the gas atmosphere can also be realized by conducting flow-through of the gas.

The ambient gas is desirably 10 vol % or higher in concentration of the boron trifluoride gas. Concentrations of 10 vol % or higher allow for obtainment of higher purification effects.

The temperature of the deoxidization treatment is desirably 30 to 150° C., and more desirably 50 to 100° C. Conducting the deoxidization treatment in such a range provides an effect that unreacted silver fluoride is turned into silver tetrafluoroborate to obtain a product, which is less in undissolved matters.

The temperature of the drying is 20° C. to 200° C., and preferably 50° C. to 150° C. Exceeding 200° C. gradually initiates decomposition. Namely, silver tetrafluoroborate is gradually decomposed into silver fluoride, boron trifluoride, and hydrogen fluoride.

In the present invention, anhydrous hydrofluoric acid acts as a solvent, and never participates in reaction in itself. Thus, anhydrous hydrofluoric acid is not consumed in itself. Further, present within the anhydrous hydrofluoric acid solution after usage are residual silver fluoride, boron trifluoride, and tetrafluoroboric acid, so that the solution can be reused as a solvent for dissolving or suspending silver fluoride therein again.

Although the present invention will be more concretely described with reference to Examples, the present invention is not limited to these Examples.

EXAMPLE 1

424 g of silver fluoride was added into, stirred, and dissolved in 800 ml of anhydrous hydrofluoric acid in a reaction vessel made of fluororesin.

Introduced through a gas introduction pipe into the solution while stirring, was a boron trifluoride gas of 100 vol % as an introduction gas, to obtain deposited white crystals.

The deposited crystals were subjected to solid-liquid separation, and the thus separated crystals were subsequently placed onto a bath at 80° C. and subjected to a gas flow of boron trifluoride diluted to 50 vol % by a nitrogen gas, thereby deoxidizing the crystals.

This was followed by drying overnight in a constant-temperature drier at 105° C. while flowing a nitrogen gas therethrough, to obtain 583 g of a white powder.

The thus obtained product was a high purity one exhibiting a silver tetrafluoroborate content of 99% or more, and an undissolved residual amount of 180 ppm upon dissolution in DME (1,2-dimethoxyethane). The silver tetrafluoroborate was anhydrous crystal.

EXAMPLE 2

This example used, as an introduction gas, a boron trifluoride gas diluted to 50 vol % by a nitrogen gas.

Further, deoxidization was conducted by using boron trifluoride theoretically having a concentration of 100 vol % as a flow-through gas. The total amount of boron trifluoride as a flow-through gas was 237 g (3.50 mol) through the successive procedures.

Other aspects were the same as the Example 1.

After drying, there was obtained 592 g of a white powder.

The thus obtained product was a high purity one exhibiting a silver tetrafluoroborate content of 99% or more, and an undissolved residual amount of 390 ppm upon dissolution in DME (1,2-dimethoxyethane). The silver tetrafluoroborate was anhydrous crystal.

EXAMPLE 3

This example used, as an introduction gas, a boron trifluoride gas diluted to 20 vol % by a nitrogen gas. Since splashing of anhydrous hydrofluoric acid as a solvent was so severe during introduction of the boron trifluoride gas, 300 ml of anhydrous hydrofluoric acid was added and gas flow was continued.

Other aspects were the same as the Example 2.

After drying, there was obtained 529 g of a light brown powder.

The thus obtained product was a high purity one exhibiting a silver tetrafluoroborate content of 99% or more, an undissolved residual amount of 0.19% upon dissolution in DME (1,2-dimethoxyethane), and the main component of the undissolved residue was determined to be silver fluoride by X-ray diffraction. The silver tetrafluoroborate was anhydrous crystal.

EXAMPLE 4

This example used, as a flow-through gas, a boron trifluoride gas diluted to 30 vol % by a nitrogen gas. The total amount of boron trifluoride as a flow-through gas was 239 g (3.52 mol) through the successive procedures.

Other aspects were the same as the Example 1.

After drying, there was obtained 590 g of a white powder. The thus obtained product was a high purity one exhibiting a silver tetrafluoroborate content of 99% or more, and an undissolved residual amount of 220 ppm upon dissolution in DME (1,2-dimethoxyethane). The silver tetrafluoroborate was anhydrous crystal.

EXAMPLE 5

In this example, there was conducted only a drying treatment for the crystal obtained by solid-liquid separation, without conducting a deoxidization treatment.

After drying, there was obtained 556 g of brown crystals. The total amount of boron trifluoride as a flow-through gas was 231 g (3.41 mol) through the successive procedures.

The thus obtained product was a high purity one exhibiting a silver tetrafluoroborate content of 99% or more, an undissolved residual amount of 0.35% upon dissolution in DME (1,2-dimethoxyethane), and the main component of the undissolved residue was determined to be silver fluoride by X-ray diffraction. The silver tetrafluoroborate was anhydrous crystal.

EXAMPLE 6

This example used, as a flow-through gas, a boron trifluoride gas diluted to 10 vol % by a nitrogen gas. The total amount of boron trifluoride as a flow-through gas was 239 g (3.52 mol) through the successive procedures.

Other aspects were the same as the Example 1.

After drying, there was obtained 578 g of a white powder. The thus obtained product was a high purity one exhibiting a silver tetrafluoroborate content of 99% or more, and an undissolved residual amount of 260 ppm upon dissolution in DME (1,2-dimethoxyethane). The silver tetrafluoroborate was anhydrous crystal.

EXAMPLE 7

This example used, as a flow-through gas, a boron trifluoride gas diluted to 5 vol % by a nitrogen gas. The total amount of boron trifluoride as a flow-through gas was 237 g (3.50 mol) through the successive procedures.

Other aspects were the same as the Example 1.

After drying, there was obtained 548 g of a light brown powder. The thus obtained product was a high purity one exhibiting a silver tetrafluoroborate content of 99% or more, an undissolved residual amount of 0.28% upon dissolution in DME (1,2-dimethoxyethane), and the main component of the undissolved residue was determined to be silver fluoride by X-ray diffraction. The silver tetrafluoroborate was anhydrous crystal.

Industrial Applicability

The silver tetrafluoroborate produced by the production method of the present invention is useful as an organic synthesis catalyst, and an electrolytic additive of a lithium ion battery.

The invention claimed is:

1. A production method of silver tetrafluoroborate, comprising:
reacting silver fluoride with boron trifluoride in a presence of anhydrous hydrofluoric acid, the anhydrous hydrofluoric acid being an inert solvent;
separating the silver tetrafluoroborate deposited or crystallized in anhydrous hydrofluoric acid solution from the anhydrous hydrofluoric acid solution; and
conducting a deoxidization treatment of the silver tetraflouroborate by conducting flow-through of a gas containing boron trifluoride from an exterior of the silver tetrafluoroborate, after separating the silver tetrafluoroborate.

2. The production method of silver tetrafluoroborate of claim 1, wherein the reacting step comprises a step of:
introducing an introduction gas containing a boron trifluoride gas, into a solution obtained by dissolving or suspending silver fluoride in solution of anhydrous hydrofluoric acid, to thereby react silver fluoride with boron trifluoride.

3. The production method of silver tetrafluoroborate of claim 2, wherein the boron trifluoride gas in the introduction gas has a concentration of 50 vol % or higher.

4. The production method of silver tetrafluoroborate of claim 3, wherein the boron trifluoride gas in the introduction gas has a concentration of 100 vol %.

5. The production method of silver tetrafluoroborate of claim 2, wherein the boron trifluoride gas in the introduction gas has a concentration of 50 vol % or higher.

6. The production method of silver tetrafluoroborate of claim 1, wherein the deoxidization treatment is conducted at 30 to 150° C.

7. The production method of silver tetrafluoroborate of claim 6, wherein in the conducting step, the boron trifluoride in an atmosphere has a concentration of 10 vol % or higher.

8. The production method of silver tetrafluoroborate of claim 6, wherein the deoxidization treatment is followed by drying at a temperature of 20° C. to 200° C.

9. The production method of silver tetrafluoroborate of claim 1, wherein the deoxidization treatment is conducted at 50 to 100° C.

10. The production method of silver tetrafluoroborate of claim 9, wherein in the conducting step, the boron trifluoride in an atmosphere has a concentration of 10 vol % or higher.

11. The production method of silver tetrafluoroborate of claim 9, wherein the deoxidization treatment is followed by drying at a temperature of 20° C. to 200° C.

12. The production method of silver tetrafluoroborate of claim 1, wherein in the conducting step, the boron trifluoride in an atmosphere has a concentration of 10 vol % or higher.

13. The production method of silver tetrafluoroborate of claim 12, wherein the deoxidization treatment is followed by drying at a temperature of 20° C. to 200° C.

14. The production method of silver tetrafluoroborate of claim 1, wherein the deoxidization treatment is followed by drying at a temperature of 20° C. to 200° C.

15. The production method of silver tetrafluoroborate of claim 14, wherein the drying temperature is 50° C. to 150° C.

16. The production method of silver tetrafluoroborate of claim 1, wherein anhydrous hydrofluoric acid is that collected from solution after deposition of silver tetrafluoroborate.

17. The production method of silver tetrafluoroborate of claim 1, wherein the reacting step is performed without using an organic solvent.

18. The production method of silver tetrafluoroborate of claim 1, wherein the silver tetrafluoroborate has a purity of 99 % or more.

19. A production method of silver tetrafluoroborate, comprising:
reacting silver fluoride with boron trifluoride in an inert anhydrous hydrofluoric acid solvent;
separating the silver tetrafluoroborate deposited or crystallized in anhydrous hydrofluoric acid solution from the anhydrous hydrofluoric acid solution; and
conducting a deoxidization treatment of the silver tetraflouroborate by conducting flow-through of a gas containing boron trifluoride from an exterior of the silver tetrafluoroborate, after separating the silver tetrafluoroborate.

20. The production method of silver tetrafluoroborate of claim 19, wherein the silver tetrafluoroborate has a purity of 99 % or more.

* * * * *

UNITED STATES PATENT AND TRADEMARK OFFICE
CERTIFICATE OF CORRECTION

PATENT NO.       : 8,501,138 B2
APPLICATION NO. : 11/887324
DATED            : August 6, 2013
INVENTOR(S)      : Kikuyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Fifteenth Day of September, 2015

Michelle K. Lee
*Director of the United States Patent and Trademark Office*